Nov. 14, 1961   C. ALIMANESTIANO   3,008,590
AUTOMATIC VEHICULAR PARKING DEVICE
Filed May 22, 1958   6 Sheets-Sheet 1

INVENTOR.
CONSTANTIN ALIMANESTIANO
BY George Spector
AGENT

Nov. 14, 1961   C. ALIMANESTIANO   3,008,590
AUTOMATIC VEHICULAR PARKING DEVICE
Filed May 22, 1958   6 Sheets-Sheet 2

INVENTOR.
CONSTANTIN ALIMANESTIANO
BY George Specter
AGENT

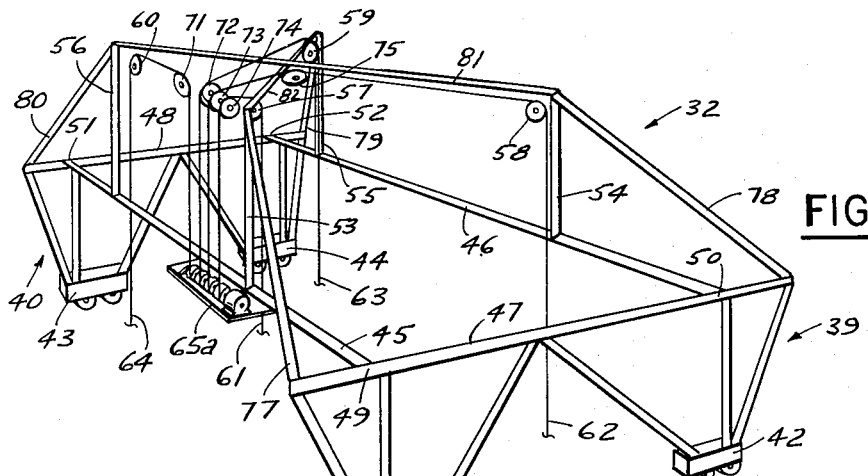

Nov. 14, 1961 C. ALIMANESTIANO 3,008,590
AUTOMATIC VEHICULAR PARKING DEVICE
Filed May 22, 1958 6 Sheets-Sheet 4

INVENTOR.
CONSTANTIN
ALIMANESTIANO
BY: George Spector

AGENT

Nov. 14, 1961   C. ALIMANESTIANO   3,008,590
AUTOMATIC VEHICULAR PARKING DEVICE
Filed May 22, 1958   6 Sheets-Sheet 5

INVENTOR.
CONSTANTIN ALIMANESTIANO
BY George Spector

AGENT

United States Patent Office 3,008,590
Patented Nov. 14, 1961

3,008,590
AUTOMATIC VEHICULAR PARKING DEVICE
Constantin Alimanestiano, New York, N.Y.
(905 Winona St., Chicago 40, Ill.)
Filed May 22, 1958, Ser. No. 737,150
4 Claims. (Cl. 214—16.1)

This invention relates to a novel portable device for increasing the capacity of an outdoor parking lot by providing storage spaces above the vehicles parked on the ground.

This application is a continuation-in-part of an earlier related application, Serial Number 672,663, filed on July 18, 1957 by the same inventor (Patent Number 2,936,082). Priority for the instant application is claimed on the basis of the earlier pending application.

In the earlier application a device is disclosed which is fixedly secured to the parking lot ground by means of footings. The device is a crane-like structure with an overhead carrier movably mounted thereon having means for causing longitudinal movement of the carrier relative to the fixed structure. A plurality of cages in which vehicles can be stored are suspended from the same structure over which the carrier traverses. The carrier is provided with transporting and hoisting means for delivering the cages to and from the position of storage on the structure to a loading area on the ground under a terminal portion of the structure. Thus cages can be loaded from the ground to be stored on the structure above the lot and vehicles parked in cages, returned to the owner by means of the carrier with its suitable transporting and hoisting means.

In the instant application a modified form of the above device is disclosed introducing several novel improvements. For example, portable modular units are used each of which can accommodate a predetermined number of vehicles. Instead of fixed footings the entire unit is made transportable by towing through the provision of wheel supports. Thus a parking lot can be provided with as many units as desired for temporary time periods. Parking lots of all sizes and shapes can be accommodated.

Further new disclosures relate to improved forms of the carrier and transporting mechanisms which simplify construction, maintenance operation and reduce related costs. The operation of this device is fully automatic requiring the services of a single operator. Thus additional personnel are not needed. By merely actuating a push button on a panel board a vehicle is safely transported to a storage space on the structure above the parking lot or returned to the owner from the storage space to a conveniently located loading port area. Since all transportation of the vehicles to and from storage occurs overhead, the decrease in use of the surface parking areas is practically negligible. Thus it is possible to achieve up to a 90% increase in parking capacity of any sized parking lot.

Consequently it is the primary object of this invention to provide a movable modular unit for parking cars at a minimum elevation above the vehicles parked on the lot surface without significantly interfering with the moving of cars on the lot surface whereby the cars are parked on the unit in movable cages and the cages are transported by a carrier which fits about the cages with clearance at the top and sides of the cages thereby reducing the overall required height of structure.

Another important object of the invention is to provide a movable unit for storing cars at a minimum elevation above the vehicles parked on the lot surface whereby the cars are carried by cages which are deposited on the unit by a longitudinally moving carrier and where the cages are supported on the unit along the bottoms of the cages and the carrier passes over and laterally spaced from the cages.

Additional features and novel objects of this invention will be made apparent from the following description, claims and attached drawings in which:

FIGURE 1 is a perspective view of an assembled unit in operation. Portions of the structure in the loading port area are broken away to reveal more clearly details of the components which hoist and transport the vehicles.

FIGURE 2 is an elevational view of the front end of the device showing the hoisting and transporting components positioned over the loading port area. Adjoining storage berths are shown supporting empty cages used to park the vehicles. The dotted lines represent a hoisting component in its upper position.

FIGURES 2 and 3 are end portions of the same structure and are thus aligned in the drawing.

FIGURE 4 is a perspective view of the carrier which transports the hoisting equipment and cages longitudinally of the structure.

FIGURE 5 is a perspective view of the hoisting bell which is transported and operated by the carrier of FIGURE 4.

FIGURE 6 is a perspective view of the cage in which vehicles are stored.

FIGURE 7 is a schematic perspective of the mechanism that is mounted on the carrier of FIGURE 4 used to operate the hoisting bell of FIGURE 5.

FIGURE 8 is a perspective view of the rollers used to guide the bell of FIGURE 5 in its vertical movement.

Figure 1:
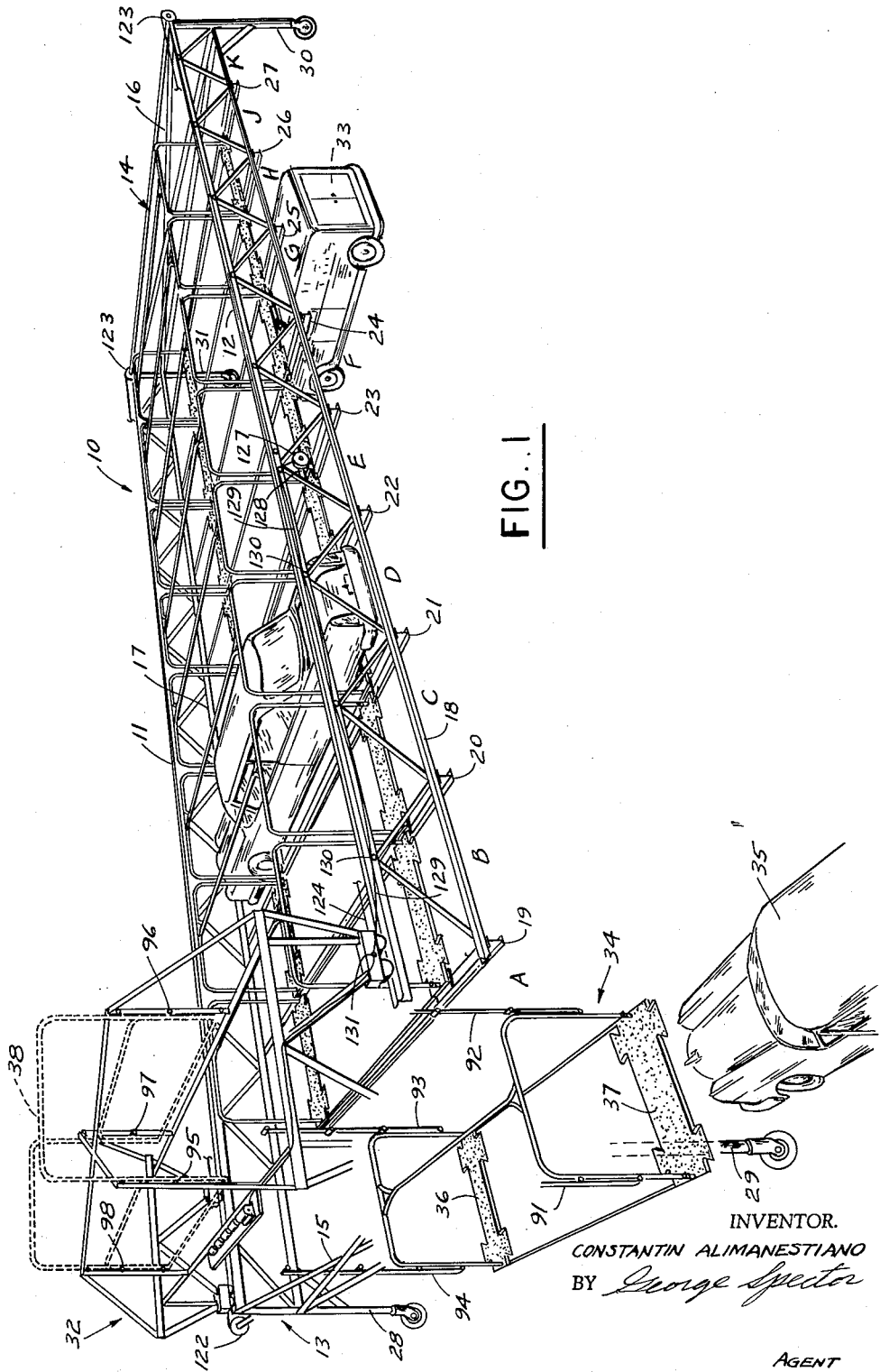

A general understanding of the construction and operation of this invention will be best obtained by referring to the perspective assembly of FIGURE 1 in which a modular unit 10 is depicted. Any number of these units can be transported to a parking lot and arranged to cover as large an area as is desired. Each unit 10, comprises a pair of parallel similar trusses 11 and 12 connected at the front and rear ends 13 and 14 by portal braces 15 and 16 respectively. At spaced longitudinal intervals the lower chords 17 and 18 of the trusses are rigidly interconnected with beams 19, 20, 21, 22, 23, 24, 25, 26 and 27 forming ten successive bays. The bay adjacent to the front end 13 will be referred to as the loading port and identified by the letter A. The other nine bays will be referred to as storing berths designated B, C, D, E, F, G, H, J and K respectively from the front end to the rear end. The loading port A is broken away to better reveal the apparatus used to hoist and transport vehicles to the proper berths. The unit 10 is supported at the four corners by columns 28, 29, 30 and 31, each of which is equipped with wheels having universal pivotal motion relative to the columns. Berths B through K are provided with horizontal diagonal stiffeners which are connected near to the ends of the beams. The stiffeners (see FIGURE 10) are not shown in FIGURE 1 in the interests of clarity. Loading port A has no such stiffener because the rectangular space surrounded by beam 19, truss 12, portal 15 and truss 11 must be unobstructed from the ground to the space enclosed by a carrier 32 which rides on the top flanges of the trusses over the berths as will be described in greater detail. This unobstructed space is required for the vertical movement of the hoisting equipment that raise and lower the stored vehicles. The lower chords 17 and 18 of the trusses are at an elevation which permits parking of vehicles such as 33 on the ground with a minimum of overhead clearance. Thus the only interference to ground parking resulting from an installation of the unit 10 on a parking lot, is at the columns and loading port. The unit can be designed for lengths that will bridge the longest dimension of a parking lot thereby leaving the spanned area of the lot clear for usual ground parking. The loading port area can be used to move cars about on the surface when the hoisting equipment is idle, since the normal idle position of the hoisting equipment is on top of the trusses as will be made clear.

The vehicles are stored and transported in cages 34 which normally occupy the berths B through K. By means of hoisting equipment to be described in detail, a cage can be selected and brought by electric-mechanical automatic means to the position depicted in FIGURE 1 where it rests on the ground. A vehicle such as 35 is parked on platforms 36 and 37 and then by merely actuating a button on a selector board, the operator can cause the loaded cage to return to its berth, that is, the berth from which the cage was removed and stored there with the vehicular cargo. A loaded cage can be returned to the loading port in an inverse similar manner when required and the vehicle can be driven away. The cages are lifted and carried by a hoisting bell, 38, which in turn is carried by the carrier 32. Ascent and descent of the bell 38 from the carrier is accomplished by a cable pulley mechanism which will be described.

The details of the hoisting equipment components is shown in greater detail in FIGURES 4 through 8 wherein the carrier is seen to comprise similar spaced parallel frames 39 and 40 equipped with wheels, housings 41, 42, 43, and 44. The frames 39 and 40 are rigidly interconnected by transverse rods 45 and 46 attached at the extremities to top chords 47 and 48 at joints 49, 50, 51 and 52 to form a rectangular enclosure that generally bounds the loading port space. Vertical posts 53, 54, 55 and 56 project upwardly from frames 39 and 40. Pulleys 57, 58, 59 and 60 are mounted near the top of the posts to support and guide cables 61, 62, 63 and 64 which raise and lower the bell 38 shown in its operative alignment below the carrier in FIGURE 5. The cables are operated by a motor 65 mounted on bracket 65a which rotates a shaft 66 (see FIGURE 7) that is provided with pulley reels 67, 68, 69 and 70 which play out the lifting cables, 61, 62, 63 and 64 respectively. Sheaves 71, 72, 73, 74 and 75 are mounted at suitable places on the carrier structure to guide the cables from the operating reels to the pulleys 60, 59, 58 and 57 attached to posts 56, 55, 54 and 53. Braces 77, 78, 79 and 80 in combination with the diagonals 81 and 82 provide lateral stability to vertical posts 53, 54, 55 and 56. It is to be noted that the pulleys 57, 58, 59 and 60 are mounted on the diagonals 81 and 82 adjacent and spaced from the lifting posts 53, 54, 55 and 56 whereby the lifting stress is delivered to the posts with only slight bending moment, that is, the eccentricity of the vertical load relative to the vertical axis of the posts is kept at a minimum. The eccentricity is required to permit the cables to clear the carrier framework and to align accurately with the bell components seen in FIGURE 4.

The hoisting bell seen in FIGURE 5 is dimensioned to be reciprocated through the loading port and through the enclosure formed by frames 45 and 46 of the carrier 32. FIGURES 4 and 5 are related in that the carrier 32 and bell 38 are depicted in the vertical alignment assumed when in operation thus the cable portions 61, 62, 63 and 64 of both figures are really aligned portions of the same cables. In similar fashion FIGURE 6, which shows a cage 34, is related to the overlying FIGURES 4 and 5. The cage of FIGURE 6 is in the vertical alignment with the carrier and bell of FIGURES 4 and 5 that occurs during operation.

Figure 3:
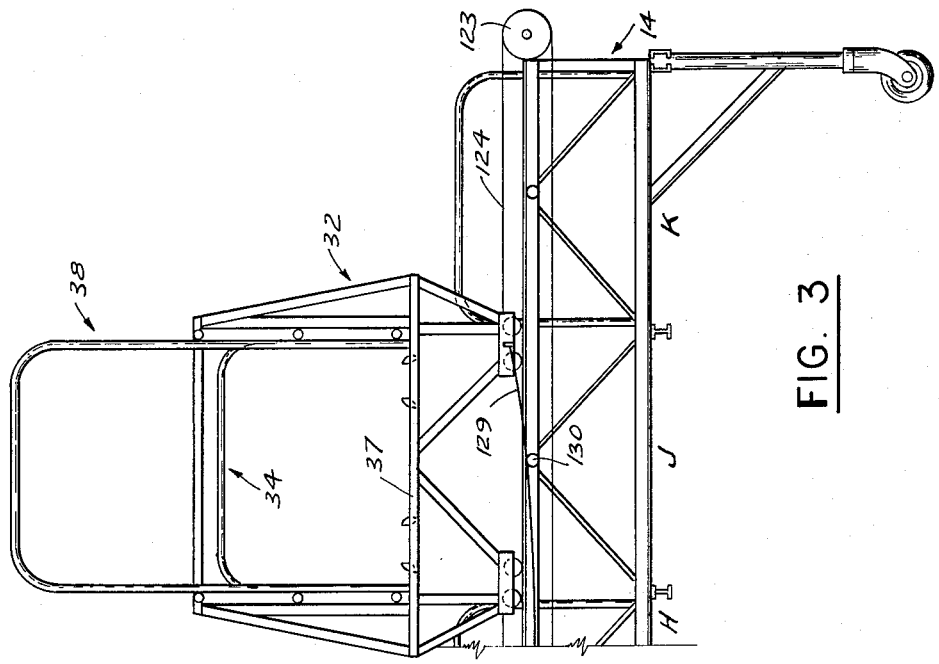
FIGURE 3 is an elevational view of the rear end of the device showing the hoisting and transporting components over an empty storage berth in position to deposit a cage used to store vehicles in the berth.
Figure 2:
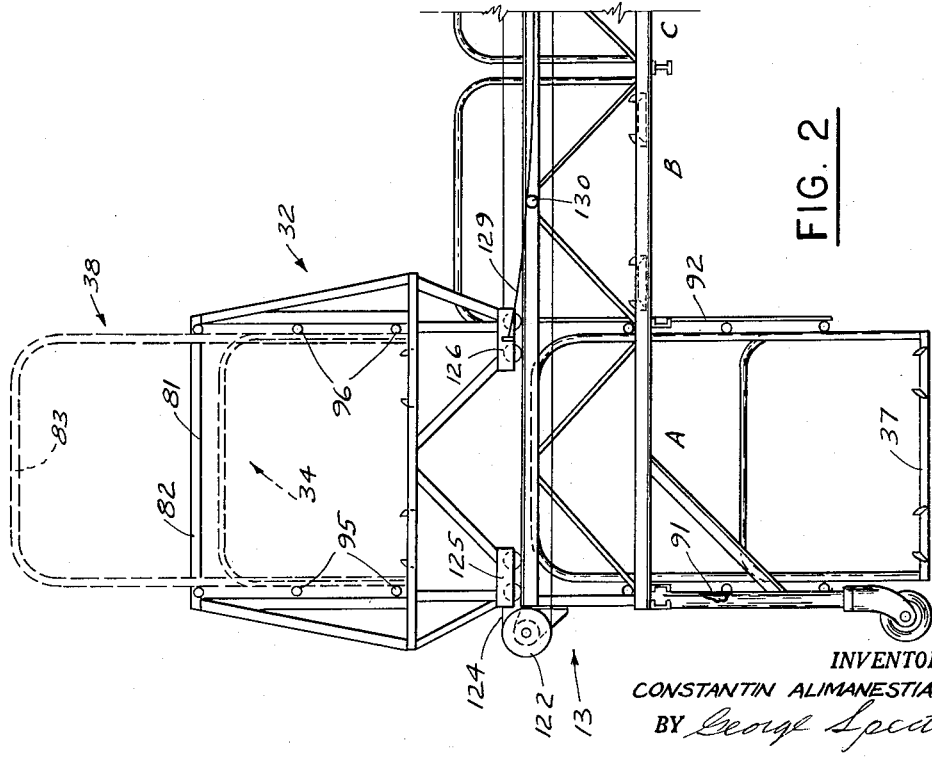

The bell 38 comprises U-shaped lifters 83 and 84, connected by pairs of spaced transverse struts 85, 85a, 86 and 86a. At the base of the lifter, lifting latches 87, 88, 89 and 90 are provided for grasping the cage 34 in a fashion to be described in more detail in connection with FIGURES 12, 13 and 14. Cables 61, 62, 63 and 64 are secured to the extremities of struts 85 and 86 closely adjacent the vertical members of the lifters 83 and 84. The bell dimensions are such that the lifters will just clear the frames 45 and 46 of the carrier when raised to the uppermost position shown in FIGURES 1, 2 and 3 within the carrier. As seen best in FIGURE 2, the lifters 83 and 84 project above the top diagonals 81 and 82. For guiding the bell accurately in a vertical direction, guide rollers are mounted on vertical bars such as 91, 92, 93 and 94 secured to beam 19 and portions of portal 15 (best seen in FIGURE 1). The bars 91 thru 94 are generally aligned with posts 53, 54, 55 and 56 of the carrier whereby the rollers are positioned to engage slidably the vertical portions of the lifters 83 and 84 of the bell. In addition posts 53, 54, 55 and 56 are also fitted with guide rollers 95, 96, 97 and 98 (see FIGURE 1) which engage the vertical portions of lifters 83 and 84. The extended height of lifters 83 and 84 is required to cause the lifters 83 and 84 to engage the guide rollers when the bell is being lowered to deposit a cage in a storage berth (B to K), rollers 95, 96, 97 and 98 accurately guide the bell in a vertical direction. FIGURE 8 shows a typical roller 99 used on a bar such as 92 or on the posts 53, 54, 55 and 56.

Inasmuch as the cables are operated off a single shaft 66, it is evident that they will ascend and descend at the same rate of speed thereby causing the bell to move vertically without tilting.

Figure 12:
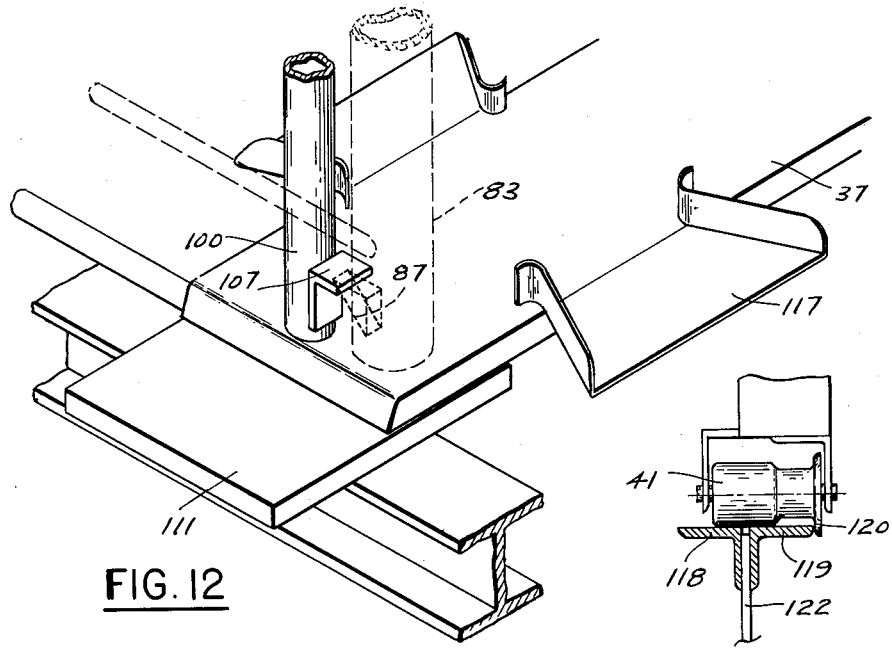
FIGURE 12 is a perspective view of part of the cage structure showing its relationship to the storage berth and the hoisting bell component which is used to lift the cage.
Figures 13, 14:
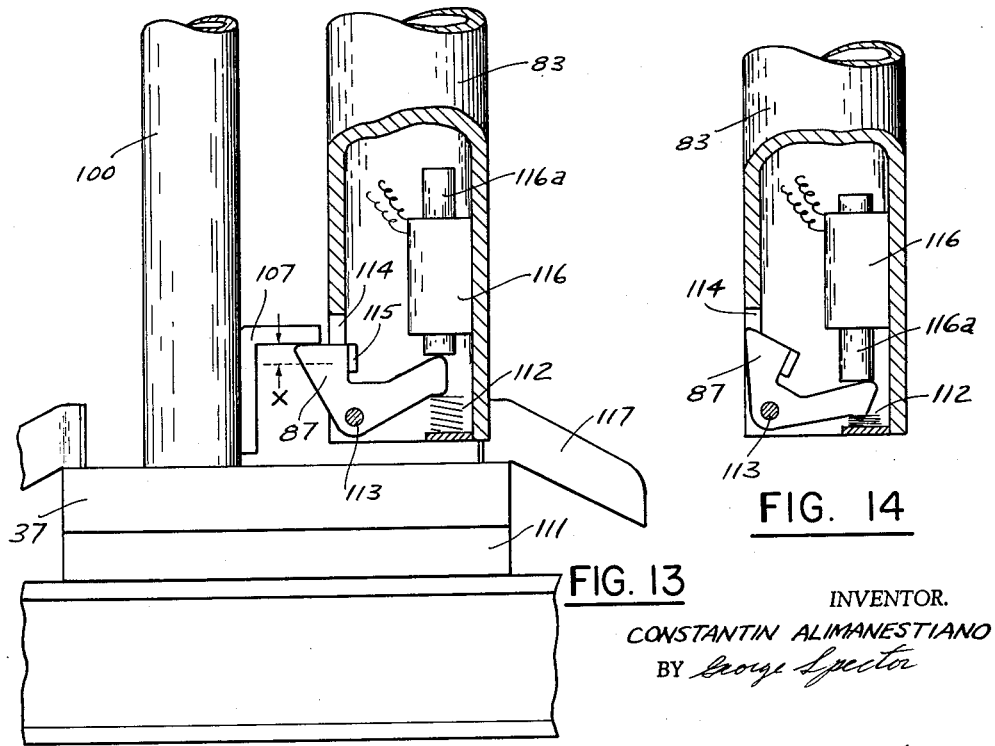
FIGURE 13 is a vertical section through plane 13—13 of FIGURE 12 showing details of the mechanisms used to lift the cage.
FIGURE 14 is a section similar to FIGURE 13 with the lifting latch retracted.

The typical cage 34 shown in FIGURE 6 includes the platforms 36 and 37 previously referred to and the stanchions 100, 101, 102 and 103 integrally joined by cross rods 104 and 105. A transverse tie 106 interlocks the stanchion pairs. At the base of each stanchion, collars 107, 108, 109 and 110 are provided adapted for engagement with latches 87, 88, 89 and 90. For a better understanding of the manner in which the cages are grasped for lifting by the bell latches 87, 88, 89 and 90 refer to FIGURES 12, 13 and 14 where latch and collar relationship is shown in greater detail. The components related to stanchion 100 is used as an illustration. In FIGURE 12 one of the unit beams 19 is also depicted to illustrate the manner in which the cage platforms such as 37 is supported in a storage berth. Plates such as 111 are mounted on the top flange of the beams to provide adequate bearing area for the platforms. Collar 107 comprises a dip angle whose outstanding leg projects outwardly of the cage towards the position assumed by the latch 87 on lifter 83. The vertical portions of the lifters 83 and 84 are positioned outwardly of the stanchions as shown in FIGURE 12. Accurate lateral alignment with the collars is effected by the aforementioned roller guides and struts 85, 85a, 86 86a. As seen in FIGURE 13, latch 87 is biased outwardly of lifter 83 by a spring 112. The latch pivots about a pin 113 and protrudes through a slat 114 formed through the lifter casing. Thus when the lifter descends, latch 87 engages collar 107 and is forced into the lifter 83 until latch 87 is below collar 107. As soon as collar 107 is cleared, spring 112 forces the latch outwardly against lip 115 and beneath collar 107. Thus when the lifter again ascends latch 87 engages collar 107 to lift the cage. A solenoid 116 is provided in the casing of lifter 83 to retract the latch when it is desired to deposit a cage in a storage berth. The function of this solenoid will be described in connection with the storage phase of the operation of the invention. As an aid in accurately guiding the wheels of vehicles onto the platform 37 of the cage, each platform is equipped with bevelled ramps 117 as shown.

Figure 9:
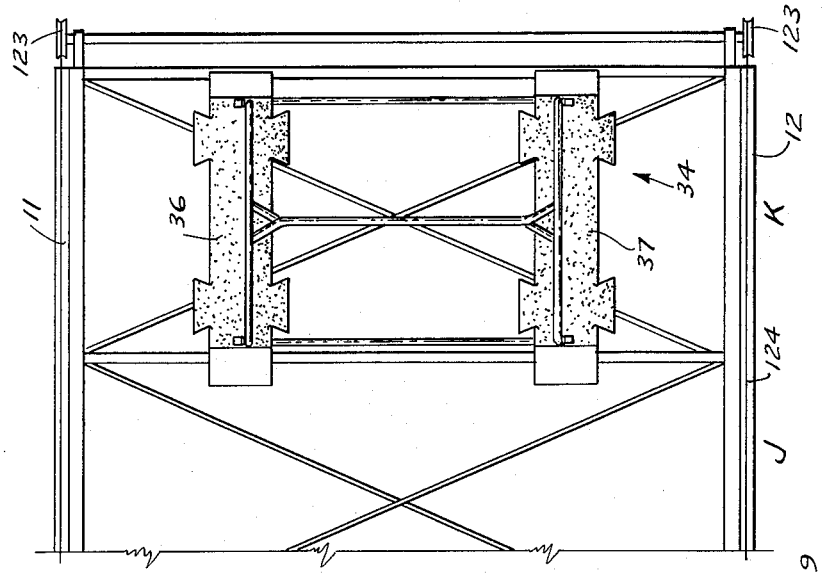
FIGURE 9 is a plan view of a cage as stored in a berth of FIGURE 3.

In the plan view of FIGURE 9, a cage 34 is shown in its storage position within a typical berth such as K. An empty cage is shown to present a clear picture. It should be understood that cage transportation is not affected by the presence or absence of a vehicle, whereas the berths are always occupied by cages except the berth which the carrier is servicing.

Figure 10:
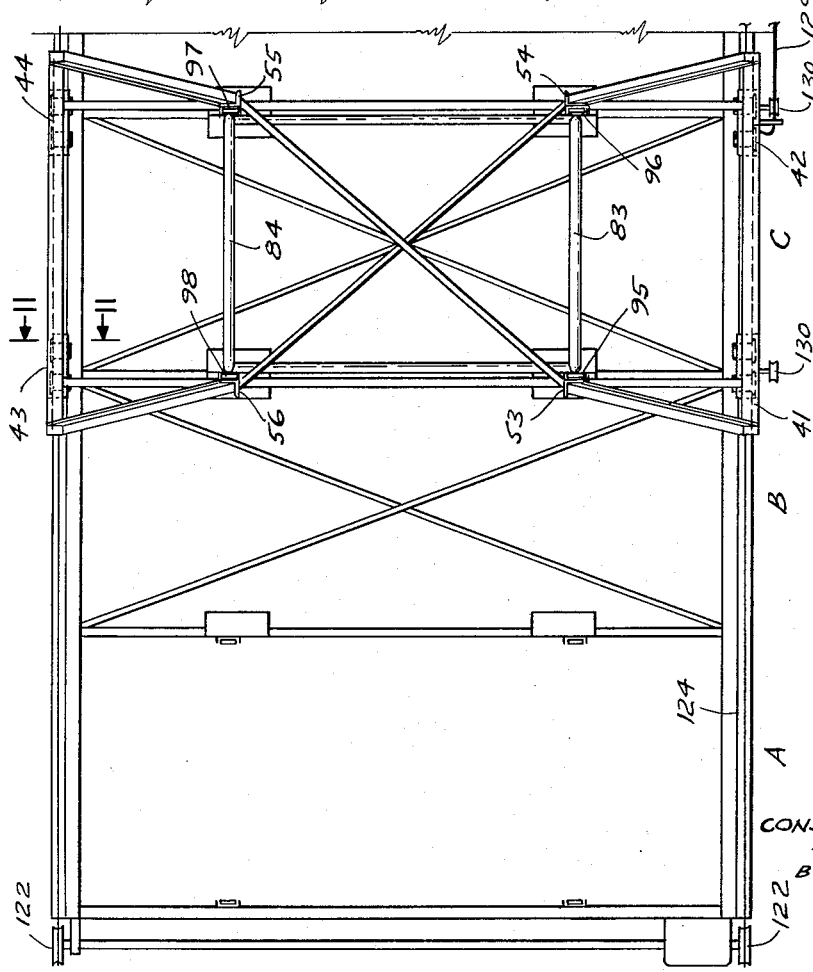
FIGURE 10 is a plan view of the carrier and hoisting bell positioned over a storage berth in FIGURE 3. For purposes of presenting a clear picture, the related position of the cage for storing vehicles is not shown in FIGURE 10.
Figure 11:
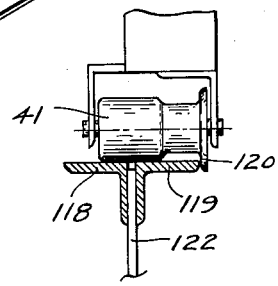
FIGURE 11 is a partial vertical cross-section through plane 11—11 of FIGURE 10 showing details of the carrier wheel and track.

FIGURE 10 is a plan view of the carrier 32 as mounted on the unit showing how it aligns with the bell 38. The rollers 95, 96, 97 and 98 are shown mounted on the lifting posts 53, 54, 55 and 56 with the bell lifters in guiding contact. Wheels 41, 42, 43 and 44 are guided along the top chords of the trusses by engagement of the wheel only flange with the edges of the top chord angles. This relationship is seen in better detail in FIGURE 11 wherein top chord angles 118 and 119 function as a track in guiding outer flange 120 of a wheel such as 41. The upper end of the diagonal web bracing of the trusses is seen in FIGURE 11 as a spacer 122 between angles 118 and 119.

The carriage 32 is transported along the top of the trusses (see FIGURES 2 and 3) by means of sets of motor operated pulley wheels 122 and 123 mounted opposite ends of the unit. Each pulley wheel set is aligned with a respective one of the trusses forming part of the unit 10 and driven by a single motor mounted on the front end 13 of the unit between the trusses (motor not shown). Motion is transmitted to the pulley wheels 122 and 123 via conventional bevel gearing. Pulley wheels 122 and 123 are connected with a cable or chain 124 whose ends are attached to the housings 125 and 126 of the wheels. The motor (not shown) which operates the pulley wheels 122 and 123 is reversible, that is it can run in both directions. Rotation of the motor in one direction causes the carrier to move from front end 13 to rear end 14 whereas rotation in the reverse direction causes carrier movement from rear end 14 to front end 13. Control of the motor to cause the carrier to move to selected positions is accomplished from the ground by a central panel board and other electrical equipment as will be described in detail.

The motor 65 which actuates the cables 61, 62, 63 and 64 that lift the hoisting bell are also operated from the central panel board. Power is supplied from the panel board to the motor 65 via a retracting type reel 127 mounted on a bracket 128 which is secured to truss 12 (see FIGURE 1). The reel is connected electrically with the panel board and source of power by conventional wires mounted on the unit. A full description of the electrical circuiting and related equipment necessary to operate the motor 65 and the motor which operates the pulley wheel 122 and 123 will follow. Electric cable 129 from the reel 127 is connected to the motor 65. Since cable 129 must follow the carrier in its movement along the unit, the reel 127 is located midway between the ends of the truss thus minimizing the length of cable required to permit free movement of the carrier from end to end of the structure. A set of guide sheaves such as 130 (FIGURES 1, 2 and 10) are provided on the outer face of the top chord of truss 12 to guide the cable 129 and prevent entanglement and damage. In FIGURE 10 the sheaves 130 are shown offset from the truss. A set of clamps such as 131 are provided at suitable locations on the carrier fixedly to conduct the cable 129 to the motor 65 which is mounted on the carrier.

In the following description of the movements involved in a cycle of operation of the device, the electrical circuiting and related equipment required to accomplish the operation will be referred to only in general terms since a detailed description of the electrical components will be included later in this disclosure.

In the initial condition of the device prior to actuation, termed the zero position, the carrier 32 is located at the loading port A (see FIGURE 2) with the bell 38 (shown in dotted lines) in its uppermost position within the carrier. The cables 61, 62, 63 and 64 retain the hoisting bell in this upper position. Let us assume that it is desired to park a vehicle 35 awaiting on the ground (see FIGURE 1) in one of the berths. The operator presses a button on the panel board corresponding to a berth having an unloaded cage such as for example J of FIGURE 3. Pulley wheels 122 and 123 are immediately actuated causing the carrier to proceed towards berth J. When the carrier is aligned over berth J the carrier stops through the activation of appropriate limit switches and built-in motor brakes trapped by the carrier. Upon stopping, the circuit which powers motor 65 is automatically energized and the cables 61, 62, 63 and 64 are played out from their respective reels causing the bell 38 to vertically descend. During such descent the bell is accurately guided by the rollers such as 95 and 96 on carrier 32 to cause the lifters 83 and 84 to assume the position depicted in FIGURE 12. As explained previously, latches 87, 88, 89 and 90 at the base of the lifters can pass below collars 107, 108, 109 and 110 respectively due to the resilient biasing of spring 112. When the bell lifters 83 and 84 contact platforms 36 and 37 the bell stops due to the operation of suitable limit switches. In the lowermost position a clearance "X" exists between the collar 107 and latch 87 for reasons to be disclosed. Shortly after stopping in the aforesaid position, motor 65 automatically reverses and the bell 38 starts to ascend. As soon as clearance is traversed, the lifter latches 87, 88, 89 and 90 engage the respective collars 107, 108, 109, 110 causing the cage 34 to be carried upward. Upon assuming the uppermost position of FIGURE 3, the motor 65 automatically stops through proper limit switch installations. It is to be noted that in the upper position of FIGURE 3, the platform 37 clears the tops of the cages shown as for example in berths B and C of FIGURE 2. Upon cessation of vertical upward motion of the bell and cage, the motor (not shown) which operates pulley wheels 122 and 123 are automatically actuated in a reverse direction from the initial motion of this motor. Thus cable 124 pulls the carrier 32 back towards loading port A with the cage 34 in the carrier clearing the other cages resting in their respective berths. When the carrier returns to its initial position over the loading port A, the motor operating the carrier stops via limit switches. The operator must now press another button which causes motor 65 to lower the bell 38 by means of the cables 61, 62, 63 and 64. When the bell has reached its lowermost portion in FIGURE 2, the cage platforms 36 and 37 will be resting on the ground. Motor 65 (FIGURE 1) is then driven onto cage platforms 36 and 37 using ramps 117 for guidance. Note the vehicle can be driven in from either end of the cage. The platform spacing is such that most wheel bases can be accommodated. As better seen in FIGURE 9, sufficient clearance is provided between the platforms 36 and 37 and trusses 11 and 12 to accommodate vehicles with varying degrees of front and end chassis overhang.

When the vehicle is properly disposed on the cage platform, the operator presses another button which causes a reverse motivation of motor 65 causing ascent of the bell with its cage and vehicular cargo. Accurate vertical alignment of the bell 38 in its ascent or descent is effected by the engagement of the vertical portions of lifters 83 and 84 with the rollers mounted on bars such as 91 and 92 shown in FIGURES 1 and 2. When the bell enters the carrier area, it is again noted that rollers 95 and 96 continue the proper vertical guidance of the bell. Upon assuming the uppermost position in carrier 32 (FIGURES 1 and 2), the motor 65 again automatically cuts out and simultaneously the motor which operates pulley wheels 122 and 123 and cable 124 is energized in the forward direction. It is to be noted that in FIGURES 1 and 2, the vehicle cargo is not shown in order not to confuse the illustration. Energization of the pulley wheels 122 and 123 is effected without requiring further button manipulation by the operator. Only the limit switch which controls the movement to berth J (the berth from which the cage originated) is capable of being energized after the first actuation of the button controlling berth J. Thus when the operator manually operates the button which results in the upward movement of the bell from the loading area, the carrier automatically proceeds towards berth J after the bell has assumed its uppermost position within the carrier. Upon reaching the properly aligned position over berth J, the motor operating the carrier again cuts out and simultaneously actuates motor 65 causing the bell to descend into the berth. The bell descends to the position where cage platforms 36 and 37 contact plates 111. Then the bell continues its descent further until lifters 83 and 84 engage platforms 36 and 37 thereby providing a clearance between the latches such as 87 of FIGURE 13 and collar 107. When the lifters such as 83 engage platform 37, the motor 65 stops and reverses its direction. At the same time that the reversal occurs, solenoid 116 is energized and its piston 116a moves towards the inner end of latch 87 forcing it to compress spring 112 and to retract into the casing of lifter 83 as shown in FIGURE 14. Reversal of motor 65 causes ascent of the lifters which can now clear the collars 107, 108, 109 and 110 of the cage 34 thereby permitting the bell to return to the uppermost position shown in FIGURE 3. Upon returning to the upper position in the carrier, the motor 65 cuts out and at the same time pulleys 122 and 123 are actuated automatically to return the carrier and bell to the zero position where it stops ready for a new cycle of operation. Upon returning to the zero position, the solenoid 116 is deactivated allowing the spring 112 to force the latch 87 back to its outer position ready to grasp a cage in the next cycle of operation.

All cycles of operation are similar whether the object is to store a car in a berth or to retrieve a car from a berth for return to its owner. Whether the cage transported is empty or loaded, does not effect the operation. In the case where a car is to be retrieved from storage, another car can be loaded into the cage which has discharged its cargo. However, if no new car is available for parking after the original car has been unloaded, the device will ground to return an empty cage to its berth and return to zero position. The device, in short, is not cognizant of whether the cage is loaded or not; it merely performs its cycle.

Figure 15:
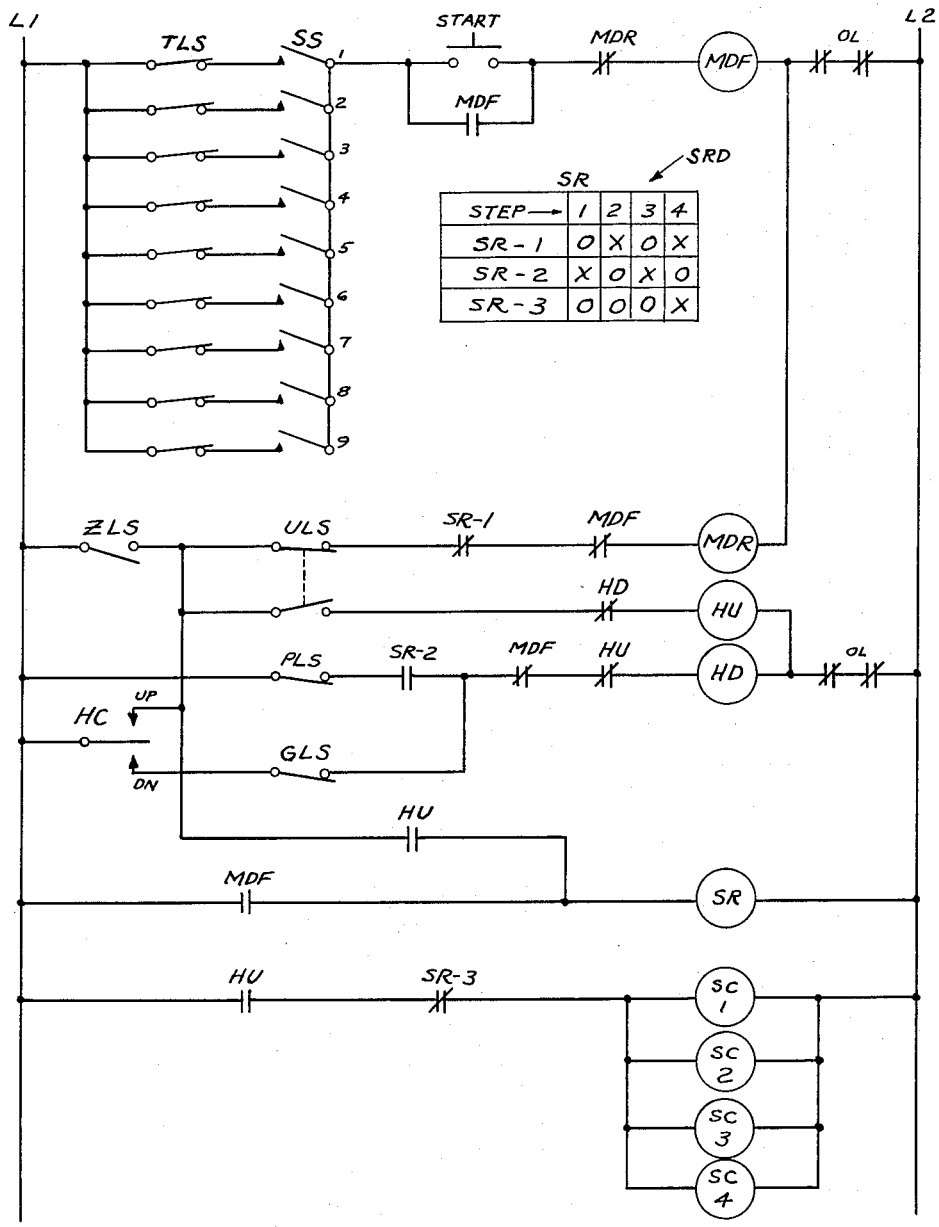
FIGURE 15 is a schematic diagram of the electric circuit and component required to operate the invention.

Referring now to FIGURE 15, the electrical circuit or system required to effect the above mechanical movements comprises the electrical components designated on the drawing as follows:

MDF—Main drive forward coil which actuates carrier 32 from front end 13 to rear end 14 of the unit 10.
MDR—Main drive reverse coil which actuates carrier 32 in the reverse direction.
HD—Hoist down coil which actuates motor 65 causing the bell 38 to move downward.
HU—Hoist up coil which actuates hoist motor 65 in the reverse direction.
SR—Stepping relay.
SC—Solenoid coils which retract latches 87, 88, 89 and 90.
TLS—Travel limit switch which stops horizontal movement of carrier 32.
SS—Selector switch which energizes proper circuit controlling the berth to be serviced.
ZLS—Zero limit switch which stops carrier at the loading port.
ULS—Up travel limit switch which stops upward movement of bell 38 at the desired elevation in the carrier.
PLS—Parking limit switch which stops vertical descent of hoisting bell at the proper point in the berths.
GLS—Ground limit switch which stops descent of bell 38 at the ground level.
HCS—Hoist control switch which energizes circuits that control hoisting movement of bell 38.
SRD—A chart showing the condition of the various circuits that are controlled by the stepping relays—SR–1, SR–2, and SR–3. For example in step 1 of the stepping relay system, SR–1 and SR–3 are open and SR–2 is closed. The symbol "X" designating a closed circuit and "O" an open circuit.

The schematic diagram of FIGURE 15 represents the condition of the electrical components when the carrier is in the zero position over the loading port. All the cages are in their respective berths either loaded with vehicles or unloaded. When the operator closes SS (refer to the foregoing legend) "Start," then releasing, MDF is energized causing forward movement of carrier along the structure. When the carrier arrives at the selected berth, a TLS, corresponding to the berth selected by SS, is tripped mechanically by the carrier de-energizing MDF. At the time of energization of MDF, the ZLS closes causing the advance of SR from step 4 to step 1 in the chart SRD. In this position SR–1 and SR–3 are open and SR–2 is closed energizing the circuits which operate the hoisting bell 38. As soon as MDF stops, HD is energized and bell 38 descends until mechanically the bell trips a lower limit switch PLS which de-energizes HD, stopping the bell 38 in the parking position. Stoppage of bell 38 in the parking position energizes HU causing ascent of the bell and the resulting upward transportation of the selected cage as previously described. Energization of HU in turn again energizes SR advancing the stepping relay to step 2 as shown in chart SRD. Upward movement of the bell is interrupted by the tripping of upper limit switch ULS located at the desired upper elevation when the bell is in the carrier. When the bell is fully in the carrier, MDR is energized and the carrier proceeds back towards the loading port with the selected cage. Upon arriving at the loading port (zero position) limit switch ZLS is actuated stopping the carrier over the loading port. The operator now moves the HCS to the DH position and the HD coil is energized moving the bell down to the ground where it comes to rest by virtue of limit switch GLS. In the ground position a vehicle can be driven on or off the cage. The operator now moves HCS to the UP position and the HU coil is energized to move the bell and cage upward where limit switch ULS is tripped causing stoppage of the bell in the upper position in the carrier. When ULS is tripped to stop ascent of the bell, MDF is energized causing forward carrier movement. During steps 3 and 4, stepping relay SR advances through steps 3 and 4 (see chart SRD) in which solenoid coils SC–1, 2, 3 and 4 are energized causing the latches 87, 88, 89 and 90 to release the cage when the lifter 83 (see FIGURE 13) has arrived in the position where the latches have cleared the collars 107, 108, 109 and 110. The electrical circuiting which cause the return of the bell after depositing a cage in a berth is the same as was described in connection with the delivery of a cage to the loading port.

From the foregoing description it can now be appreciated that a device is herein presented which affords a practical solution to the vexing problem of providing additional parking capacity for outdoor parking lots located in busy urban areas without involving excessive costs nor encumbering the property with permanent type structure. Based on intensive engineering studies and cost estimates, it is anticipated that additional parking capacity up to increases of 90% can be achieved at the prevailing parking rates while ensuring adequate profit incentives for the parking lot operator.

Although basically the novel beneficial results achieved by this invention resides in increasing parking lot capacity without materially impeding existing operations, the modular and portable aspects of the invention permit a great flexibility in efficiently accommodating lots of varying location and dimensions. Practically no modifications in the facilities or arrangement of an existing parking lot are required to effect a rapid installation. The units are easily towed on the site and arranged as desired. Should the lot be required for other purposes, the device can be removed within an hour or two. Moreover, it can be operated profitably for time periods as small as a month. The design is such that economic utilization can be made of standard steel and electrical components. For example the trusses can be formed from standard open web joists. Should the length of the unit desired for a particular installation be excessive for transportation through the streets, the unit can be made at the shop in two parts and then field spliced.

Having thus described in detail the nature of this invention, a grant of Letters Patent is desired for the novelty as expressed in the following claims.

I claim:

1. A device for increasing the capacity of a parking lot comprising an elongated structure with vertical posts and spaced longitudinal members spanning the distance between the posts forming a longitudinal aisle, the said members having upper surfaces parallel to the axis of the aisle and transverse supports connected to the said members beneath the said upper surfaces, a carrier mounted movably on the upper surfaces, a plurality of cages having means for engaging the said supports to maintain the cages on the device entirely above the supports, said upper surfaces being below the tops of cages stored on the transverse supports, said cages being dimensioned to fit between the said members, said carrier comprising components forming an aperture dimensioned to bridge over and laterally clear the said cages when they are resting on the said supports, a lifter means for the cages mounted on the said carrier within the said aperture, said lifter means and said carrier including vertical guide elements to cause the cages to maintain an accurately vertical movement, said lifter means being provided with means for engaging and lifting said cages, means for actuating the lifter to a position wherein the cages are raised within the carrier to an elevation above the cages resting on the transverse supports and to another position wherein the cages are deposited on the transverse supports, in combination with a loading port having a clear space from the lot surface through the device adapted to accommodate a cage and the lifter means, including guides mounted on the device at the port in alignment with the guides on the carrier whereby the cages are guided continuously in an accurately vertical path when passing through the loading port, including means for moving the carrier along the axis of aisle to a series of preselected positions in vertical alignment over the cages resting on the transverse supports and to the position over the loading port.

2. A device as in claim 1 wherein the means for engaging and lifting the cages comprises a hook which releases the cage when the cage is deposited on the transverse supports.

3. A device as in claim 1 wherein the carrier includes vertical struts spaced to accommodate the lifter and cages including vertically aligned roller guides to guide the said cages within the said carrier.

4. A device as in claim 1 in combination with electrically actuated means for regulating and synchronizing the means for moving the carrier longitudinally and the means for moving the lifter means whereby selective actuation of the electrically actuated means will cause the uninterrupted movement of a cage from the lot surface to specific location on the device and the return movement of a cage from the position on the transverse supports to the lot surface.

References Cited in the file of this patent

UNITED STATES PATENTS

| | | |
|---|---|---|
| 894,452 | Medairy | July 28, 1908 |
| 1,584,212 | Burrell | May 11, 1926 |
| 1,828,308 | Been | Oct. 20, 1931 |
| 1,903,274 | Watson | Mar. 28, 1933 |
| 2,111,162 | Woodruff | Mar. 15, 1938 |
| 2,598,750 | Bargehr | June 3, 1952 |
| 2,670,859 | Zeckendorf et al. | Mar. 2, 1954 |
| 2,699,266 | Maurice | Jan. 11, 1955 |
| 2,815,872 | Graham | Dec 10, 1957 |